US007643422B1

(12) United States Patent
Covell et al.

(10) Patent No.: US 7,643,422 B1
(45) Date of Patent: Jan. 5, 2010

(54) DYNAMIC TRANS-FRAMING AND TRANS-RATING FOR INTERACTIVE PLAYBACK CONTROL

(75) Inventors: Michele Covell, Palo Alto, CA (US); Sumit Roy, Menlo Park, CA (US); Bo Shen, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 680 days.

(21) Appl. No.: 11/389,401

(22) Filed: Mar. 24, 2006

(51) Int. Cl.
    *H04L 12/26* (2006.01)
(52) U.S. Cl. .................................... 370/235; 709/231
(58) Field of Classification Search ................ 370/235, 370/230, 230.1, 231; 709/231, 226, 229
See application file for complete search history.

(56) References Cited

U.S. PATENT DOCUMENTS

| 6,055,560 | A * | 4/2000 | Mills et al. ................... 709/200 |
| 6,514,083 | B1 * | 2/2003 | Kumar et al. ............. 434/307 A |
| 6,549,216 | B1 * | 4/2003 | Schumacher et al. ......... 715/704 |
| 7,068,596 | B1 * | 6/2006 | Mou ........................... 370/229 |
| 2005/0201469 | A1 * | 9/2005 | Sievers et al. ........... 375/240.24 |

* cited by examiner

*Primary Examiner*—Brian D Nguyen

(57) ABSTRACT

Embodiments of the present invention recited a method and system for modifying a media stream. In one embodiment, a request is received to modify a media stream from a current display rate to a desired display rate. In response to the request, the media stream dynamically processed to create a modified media stream which is compliant with a pre-determined frame-rate limitation and with a pre-determined bit-rate limitation.

18 Claims, 6 Drawing Sheets

US 7,643,422 B1

DYNAMIC TRANS-FRAMING AND TRANS-RATING FOR INTERACTIVE PLAYBACK CONTROL

TECHNICAL FIELD

Embodiments of the present invention are related to the field of the presentation of streaming media.

BACKGROUND

Streaming media (e.g., video and/or audio) to mobile devices such as cellular telephones, personal digital assistants (PDAs), etc., is an important emerging market. For example, in order to lessen a user's perceived duration of being "on-hold," a customized movie trailer or other interesting video content may be streamed to the mobile device. Also, being able to select and watch professionally produced material such as sports, or movies while away from a home or office environment greatly expands the market for video on demand (VoD). Additionally, adding a video back channel (e.g., expressions, gestures, postures, etc.) lessens the perceived gap between remote and local interactions.

As seen with the revenue generated by the ring-back tones and the push-to-talk markets, new telco-services markets can be quite large and can occur in unexpected areas. The promise of fresh markets is one of the driving forces behind the use of third generation (3G) wireless standards in Asia and the move to these standards in Europe. Even in the United States, where 2.5G/3G adoption lags other parts of the world, there have already been some streaming video products for consumer handsets (e.g., cellular telephones).

Unfortunately, the promise of these markets is largely unrealized to date, due to two major barriers. One barrier is the fact that many of the mobile devices which access streaming media have limited capabilities (e.g., limited processing and/or memory capacities) and offer restricted interfaces to the end-user. Thus, these mobile devices lack the resources to effectively operate complex media presentation applications which can be utilized, for example, on a user's home computer, or to store large amounts of data. The restricted interfaces typically found in these devices limits how the user navigates and selects a plurality of options (e.g., voice mail options, or a list of movies which may be accessed). As a result, the user typically must wait until the options, which are presented serially over an audio interface, are presented. Another drawback to these interfaces is that the user may be required to enter a complex keying sequence to indicate a selected action.

Another barrier to these markets is the difficulty in creating new interactive applications that conform to telecommunication network requirements, for example, 3rd Generation Partnership Project (3GPP) compliant networks. This problem has been side-stepped using Internet-enabled handsets that can provide Internet-style streaming video within a telecommunications infrastructure: i-mode, 3GPP, Wireless Access Protocol (WAP), and Packet-Streaming Service (PSS). However, using Internet-based protocols for 3G video can create unnatural and unnecessary dividing lines in the consumer's interaction with video content, be it person-to-person connections, or connections with services such as Video-on-Demand, or Video Mail.

Typically, when a cellular telephone establishes communications with the network, the SIP description of the session channels and their aggregate bandwidth comprises a contract. Thus, the telecommunications network will not place the call unless there is a reasonable expectation that the contracted bandwidth will be available between the two end points for the duration of the call. The contract defines the maximum bandwidth and maximum frame rate that can be used to send, for example, video data packets. Additionally, the telecommunication channels are highly optimized to minimize latency, thereby enabling not only conversational speech, but also fast-response interactive applications. In contrast, an Internet-oriented approach only provides a "best effort" delivery of the communication channels and does not guarantee a specific bandwidth or latency.

While a telephony-oriented approach may be more desirable, there are constraints which make interactive streaming content difficult to implement. For example, when using controls on the client side to speed-up, or "sample," a video display, the increased frame rate necessitated to speed-up the video can exceed the maximum frame rate and/or the maximum bandwidth defined in the SIP contract. In another example, the original source material (e.g., a television broadcast) may exceed the maximum frame rate and/or maximum bandwidth defined in the SIP contract. As a result, it may be necessary to drop video frames and/or reduce the bandwidth in order to comply with the SIP contract. If the video codec relies upon uniform frame-spacing, one approach to maintain the pre-defined frame rate is to drop a certain percentage of the video frames in order to comply with the SIP contract. However, if the video codec allows the use of non-uniform spacing of the video frames, relying on this method typically results is less than satisfactory video quality.

Predictive coding of video frames also complicates which frames are to be dropped. In media that complies with the Moving Pictures Expert Group (MPEG) standard, some frames only comprise data that is changed from some preceding frame. Thus, intra-frames (I-frames) are single frames of content that are independent of the frames that precede and follow it and stores all of the data needed to display that particular frame. Predictive frames (P-frames) and bi-directional frames (B-frames) only comprise the data that has changed from the preceding frame (e.g., in the case of a P-frame) or data that is different from the preceding frame and the following frame (e.g., in the case of B-frames). Thus, dropping an I-frame has a significantly greater effect on video quality than dropping a P-frame, or a B-frame.

Further complicating the task of frame-rate and/or bandwidth reduction is the fact that interactive user controls allow the user to change the display rate. For example, a user may speed-up the display from real-time to 1.5× real-time. The user may then speed-up the display further to 2.0× real-time to find a desired portion of the video. The user may then slow the video display back down to real-time to view the desired portion. Thus, the processing that determines which frames to drop must be capable of dynamically changing the frame-rate of the video without significantly degrading the video quality.

DISCLOSURE OF THE INVENTION

Embodiments of the present invention recited a method and system for modifying a media stream. In one embodiment, a request is received to modify a media stream from a current display rate to a desired display rate. In response to the request, the media stream dynamically processed to create a modified media stream which is compliant with a pre-determined frame-rate limitation and with a pre-determined bit-rate limitation.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

MODES FOR CARRYING OUT THE INVENTION

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating," "sending," "modifying," "generating," "determining," "delaying," "suspending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
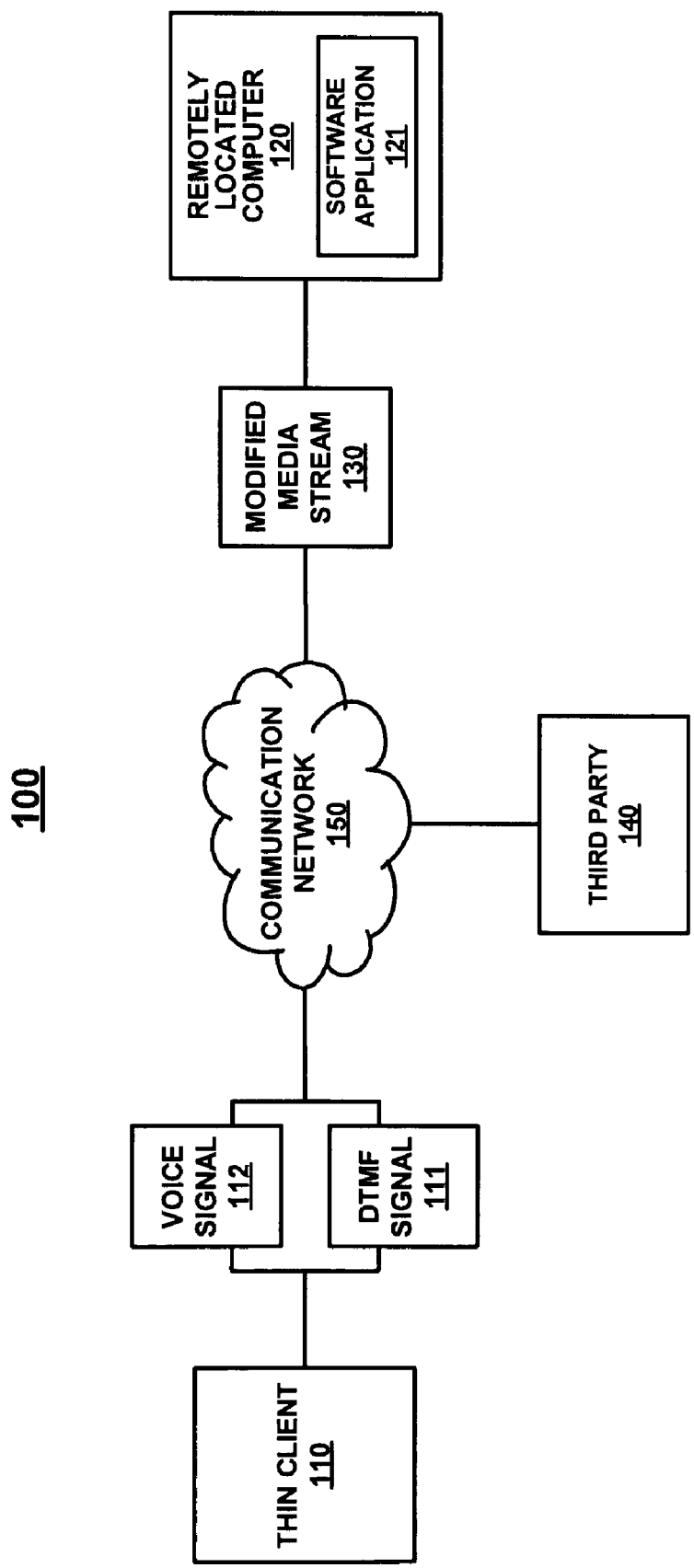
FIG. 1 is a diagram of an interactive media response system utilized in accordance with embodiments of the present invention.

FIG. 1 is a diagram of an interactive media response system 100 utilized in accordance with embodiments of the present invention. In the embodiment of FIG. 1 a media access device 110 is communicatively coupled with a media stream generating system 120 via communication network 150. In embodiments of the present invention, media device 110 comprises a "thin device" which refers to an electrical device upon which it is desired to utilize the existing control stack without modifying its existing software. In other words it is desired to add new functionality to existing legacy devices without modifying the software already operating upon them. As an example, it is desired to use a cellular telephone handset in its "telephony mode." Since the control stack in telephony mode does not typically include mid-session control messages for controlling video presentation, the client software is unaware that the playback changes are requested (e.g., using voice or DTMF commands). In embodiments of the present invention, media stream generating system 120 treats the data that has already been sent to media access device 110 as "immutable," that is, that it will be played back by media access device 110 in the form in which it was sent without local modification being performed by media access device 110. While embodiments of the present embodiment may be used in conjunction with a thin device, it is noted that media access device 110 is not limited to them alone. In other words, embodiments of the present invention are well suited to be implemented upon, for example, a home computer system, a home entertainment system, a cellular telephone, a handheld computer system, a laptop computer system, or the like.

In embodiments of the present invention, media access device 110 is operable for encoding/decoding adaptive multi-rate (AMR) audio streams and video streams compliant with the H.263 specification. Additionally, in embodiments of the present invention, media access device 110 is operable for decoding video media streams compliant with the Moving Pictures Experts Group Audio Layer 4 (MPEG4) specification. While embodiments of the present embodiment may be used in conjunction with a thin device, it is noted that media access device 110 is not limited to them alone. In other words, embodiments of the present invention are well suited to be implemented upon, for example, a home computer system, a home entertainment system, a cellular telephone, a handheld computer system, a laptop computer system, or the like.

In embodiments of the present invention, communication network 150 comprises, but is not limited to, a wireless communication network such as a cellular telephone network, a radio network, a Wi-Fi network (e.g., compliant with IEEE 802.11a or 802.11b standards), a Bluetooth wireless communication network, a radio network, an infrared (IR) communication network, a satellite link, or the like. However, embodiments of the present invention are well suited to be implemented on other networks such as an Ethernet network, a broadband connection, the Internet, or the like. In embodiments of the present invention, the communication between media access device 110 and media stream generating system 120 may comprise both an audio channel and a video channel.

In embodiments of the present invention, media stream generating system 120 comprises one or more computers for providing streaming media content to media access device 110 (e.g., a cellular telephone, a personal digital assistant (PDA), or the like). In embodiments of the present invention, a media stream generated by media stream generating system 120 may comprise video media, audio media, audio/video media, or other multiple media streams (e.g., multiple audio media streams) which are sent to media access device 110. Additionally, media stream generating system 120 is further for modifying one or more of these media streams in response to a request generated by media access device 110. In embodiments of the present invention, it may be desired to retain an unmodified control stack in media access device 110, therefore media stream generating system 120 may modify one or more of the media streams before sending it to media access device 110.

In another embodiment of the present invention, the modification to the media stream may be in response to a request from a third party (e.g., neither media access device 110, or media stream generating system 120). Referring again to FIG. 1, a third party 140 may generate a request to media stream generating system 120 to modify the media stream that is sent to media access device 110. As an example, a technical support person can generate a request to media stream generating system 120 that a demonstration video that is being streamed to a user of media access device 110. In response to the request, media stream generating system 120 generates a modified media stream 130 which is then sent to media access device 110.

Figure 2:
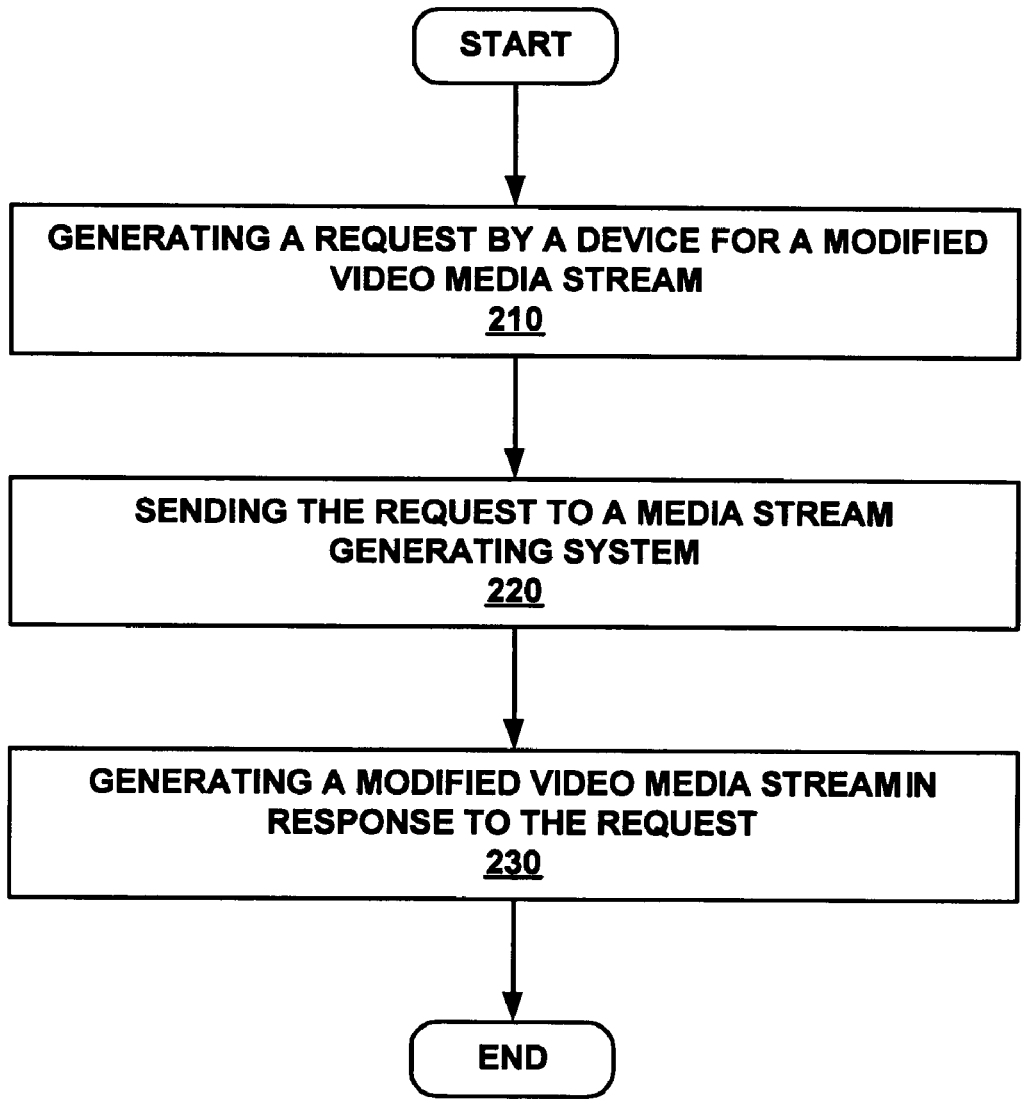
FIG. 2 is a flowchart of a method for modifying a media stream in accordance with embodiments of the present invention.

FIG. 2 is a flowchart of an exemplary method 200 for implementing an interactive media response system (e.g., 100) in accordance with embodiments of the present invention. In step 210 of FIG. 2, a request is generated to modify a video media stream. While the present method describes modifying a video media stream it is again noted that in embodiments of the present invention, the media stream may comprise an audio media stream, and audio/video media stream, or multiple media streams such as multiple audio streams. In embodiments of the present invention a user chooses to interactively control a media stream presented upon their media access device (e.g., 110). For example, a user who is watching streaming video of a movie may wish to speed up the movie to a desired scene. Alternatively, a user may be navigating a voice mail system, a video mail system, etc., and is skipping forward through the messages. As described above with reference to FIG. 1, the request may be generated by a third party as well.

In step 220 of FIG. 2, the request is sent from the media access device to a media stream generating system. In one embodiment, the request may be sent using a dual-tone multi-frequency signal. In another embodiment, the request may be sent using a voice command. While the present embodiment recites these types of signals, embodiments of the present invention may utilize a variety of well known electronic signaling methods to convey the request.

Returning to FIG. 2, in step 230, the media stream generating system generates a modified video media stream in response to the request generated in step 210 above. In embodiments of the present invention, those modifications to the media stream are implemented by media stream generating system 120 to create a modified media stream. In embodiments of the present invention, a single media stream (e.g., a video or audio media stream), or multiple media streams (e.g., an audio/video media stream, or multiple audio streams) may be generated by media stream generating system 120. In modifying the media stream, media stream generating system 120 generates a modified media stream (e.g., 130) which is then conveyed to media access device 110.

Embodiments of the present invention may be implemented upon a cellular telephone, or other electronic device which accesses a cellular telephone network. Therefore it is desirable that signaling methods compatible with a telecommunication network are implemented in embodiments of the present invention. Current telecommunication networks are optimized for low-latency, low-bandwidth voice delivery on the data path, but high latencies in the control path. For example, the IMS control plane for call setup/teardown can take more than a second end-to-end. In contrast, menu selection and playback control (e.g., barge-in to stop streaming or otherwise modify the media stream) require low-latency response times, in order to provide acceptable levels of responsiveness to the user.

The combination of long latencies in the telecommunication network's control path and responsiveness requirements for mid-call control combine to make the use of in-band signaling (e.g., where control signals are sent via the telecommunication data path) a desirable method for conveying user inputs. The use of low-latency controls is desired because if there is too long of a pause between a user command and its implementation, the user may think that the controller is broken, or that their input was not detected by media access device 110. As a result, the user may continue inputting their selection which may cause media stream generating system 120 to perform an action that the user did not intend. Alternatively, the use of out-of-band signaling may cause longer latency in responsiveness to the user's commands, thus lessening the user's perception that they are using an interactive control system.

In-band signaling for mid-call control can be done by downloading custom client software onto the media access device 110. A drawback of this method is that the software may generate its own specialized set of communication signals which may not be compatible with existing telecommunications network interface and codec standards. In embodiments of the present invention, current generic in-band encodings from the media access device 110 such as Dual Tone Multi-Frequency (DTMF) signals (e.g., 111), or voice commands (e.g., 112) are used to convey requests from media access device 110 to media stream generating system 120. Again, it is noted that embodiments of the present invention are not limited to these signals alone and may utilize software downloaded into media access device 110 if the software is compliant with existing network interface and protocol constraints.

As described above, the SIP control stack offers current client information (e.g., media access device 110) in the first SIP offer from the client device in the form of a requested Session Description Protocol (SDP) which is designed to account for dynamic conditions of the client device and current connectivity conditions. The SIP description of the session channels and their aggregate bandwidth comprises a contract. Thus, with a telephony-oriented control stack, a connection will not be made between the client device and the network unless there is a reasonable expectation that the contracted bandwidth will be available between the two end points for the duration of the call. Thus, it is important that the modified media stream requested in step 210 respects the contracted maxima for the video bit-rates and frame-rates. This contracted limit imposes constraints primarily on video media which is displayed at a faster-than-real-time rate. Slower-than-real-time playback is typically not an issue assuming that the original media stream conforms with the bit-rate and frame-rate contracts of the connection. Similarly, seeking is typically not an issue as the video display can be "frozen" if necessary.

In embodiments of the present invention, modification of the media stream is performed by a software application resident in media stream generating system 120. Remote-access applications are commonly decomposed into two pieces: the server part, which has direct access to the desired data or service, and the client part which is physically close to the user. Although historically, applications and their associated data have been installed on client personal computers, widespread and dependable connectivity has lead to a continuing trend of using generic programs, such as web browsers, to access applications running on remote servers. These generic browsers allow users instant access to new services without the burden of installing, maintaining and updating local application. Using low-latency access to remote application servers, users are not required to perform the local storage management and supervision of persistent changes that are common on personal computers. Additionally, using remote application servers means that devices with limited resources (e.g., media access device 110) benefits from the increased resource capability of the remote application server.

Thus, in embodiments of the present invention, the bulk of the application logic for modifying a media stream resides on media stream generating system 120, while a well defined, simple set of capabilities (e.g., a media browser) may be implemented on media access device 110. These capabilities may include, but are not limited to, independent audio and video streams in each direction between media access device 110 and media stream generating system 120 using a numeric keypad or speech inputs to control the behavior of the software application which controls the media streams.

As an example, a user is watching a movie on media access device 110. The user decides to speed up the playback of the movie and indicates this using media access device 110. In one embodiment, the user may simply say, "Speed up," which causes media access device 110 to generate voice signal 112. In another embodiment, the user may use the keypad of the cellular telephone to indicate this (e.g., by pressing the number 6 on their keypad to cause media access device 110 to generate DTMF signal 111. Upon receiving either of these signals, media stream generating system 120 modifies the media stream being sent to media access device 110, thus creating modified media stream 130. When received by media access device 110, modified media stream is played for the user which, in the present example, comprises speeding up the playback of the movie. In embodiments of the present invention, media stream generating system decreased the frame-rate and bit-rate of the modified media stream to make it compliant with the contracted limits on the frame-rate and bit-rate.

Embodiments of the present invention are advantageous in that they allow a user to interactively control streaming media while complying with existing telecommunication network interfaces and protocols. Additionally, the use of DTMF and/or voice signals to convey user selections makes the use of client side software downloaded onto media access device 110 unnecessary. More importantly, embodiments of the present invention can dynamically modify the display rate of the media stream in response to a request in a manner that is computationally efficient. Dynamic modification of the display rate is important in order to allow a user to interactively control the media. The user may want to speed-up the display from real-time to 1.5× real-time. The user may then want to speed-up the display further to 2.0× real-time to find a desired portion of the video. The user may then slow the video display back down to real-time to view the desired portion. As a result, merely transcoding the media content offline to comply with the frame-rate and bit-rate constraints will not respond in a timely manner to the user's request. Computational efficiency is important in order to maintain the capacity of the service provider's equipment (e.g., streaming media generating system 120) to provide economical services. Therefore, for the purposes of the present invention, "dynamically processing" the media stream means that media stream generating system 120 can generate modified media stream 130 substantially concurrent to accessing the media source (e.g., from media database 122 or via Internet 310 of FIG. 3) such that offline transcoding of the media content is not necessary.

Figure 3:
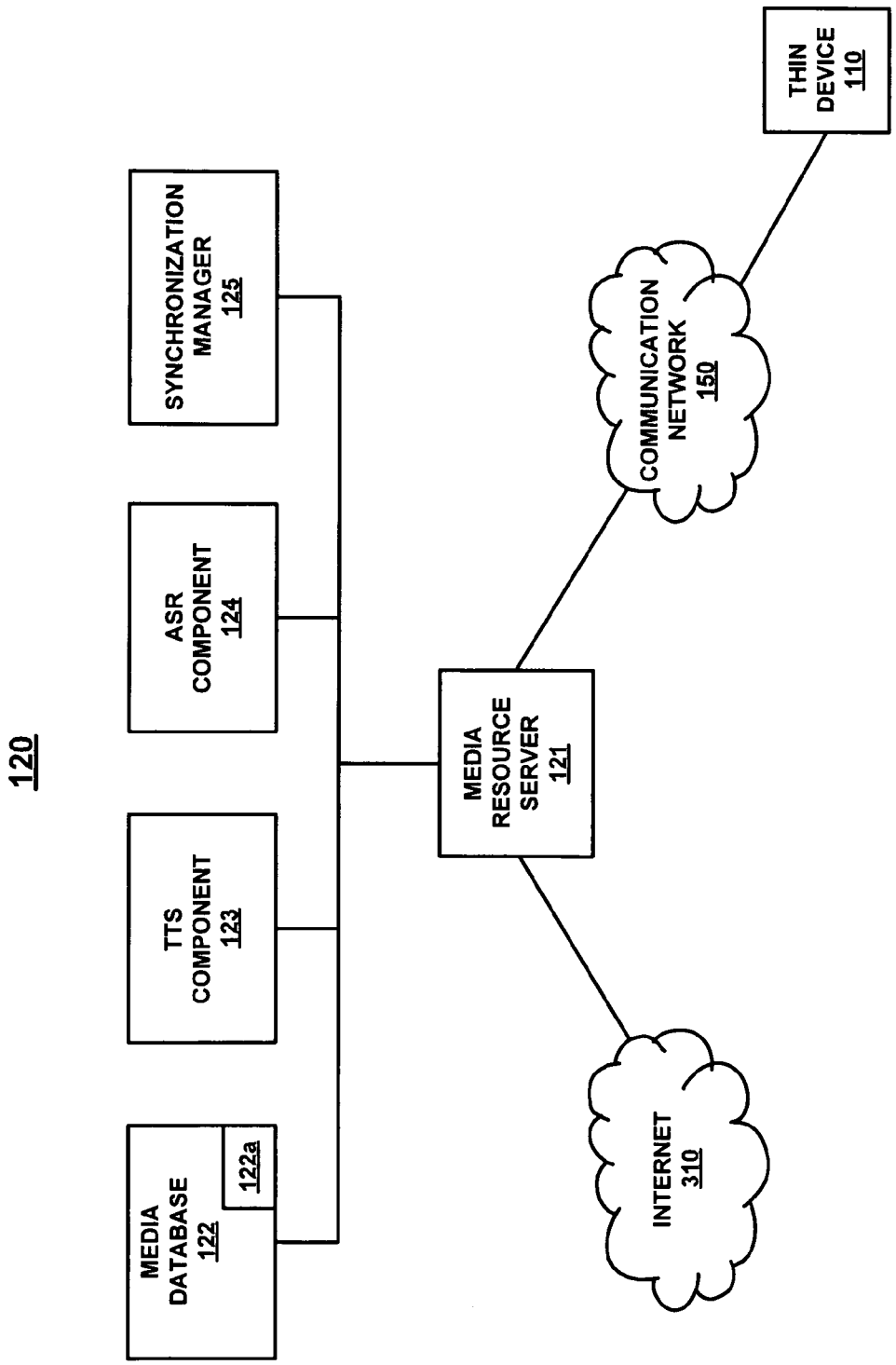
FIG. 3 is a block diagram of a media stream generating system in accordance with embodiments of the present invention.

FIG. 3 is a block diagram of an exemplary media stream generating system 120 in accordance with embodiments of the present invention. In FIG. 3, media access device 110 is communicatively coupled with media stream generating system 120 via communication network 150. A media resource server 121 is communicatively coupled with communication network 150 and is for receiving signals from media access device 110 conveying user requests for modifying an audio media stream and/or a video media stream. Media resource server 121 is further for generating the media stream and/or modified media stream to media access device 110 in embodiments of the present invention. As will be discussed in greater detail below, in embodiments of the present invention media resource server 121 may further comprise a telephone interface for communicating with communication network 150, an interface to Internet 310, an interface to communication network 320, and an interface for processing DTMF signals. Media resource server 121 is also communicatively coupled with a media database 122 upon which may be stored media files (e.g., 122a) which are accessed by media resource server 121 and sent to media access device 110. In embodiments of the present invention, media resource server 121 is also communicatively coupled with a text-to-speech (TTS) component 123 for converting text to an audible output. In embodiments of the present invention, media resource server 121 is also communicatively coupled with an automatic speech recognition (ASR) component 124 for converting spoken audio input into a textual equivalent. In the embodiment of FIG. 3, media resource server 121 is communicatively coupled with a synchronization manager 125 which controls of the playback rate of the audio and video media streams so that they can be presented in a coordinated manner at media access device 110. It is appreciated that in embodiments of the present invention, system 120 may be configured differently than is shown in FIG. 3. It is further noted that in embodiments of the present invention, media stream generating system may be implemented as a single system (e.g., a single computer system), or a plurality of networked devices.

Figure 4:
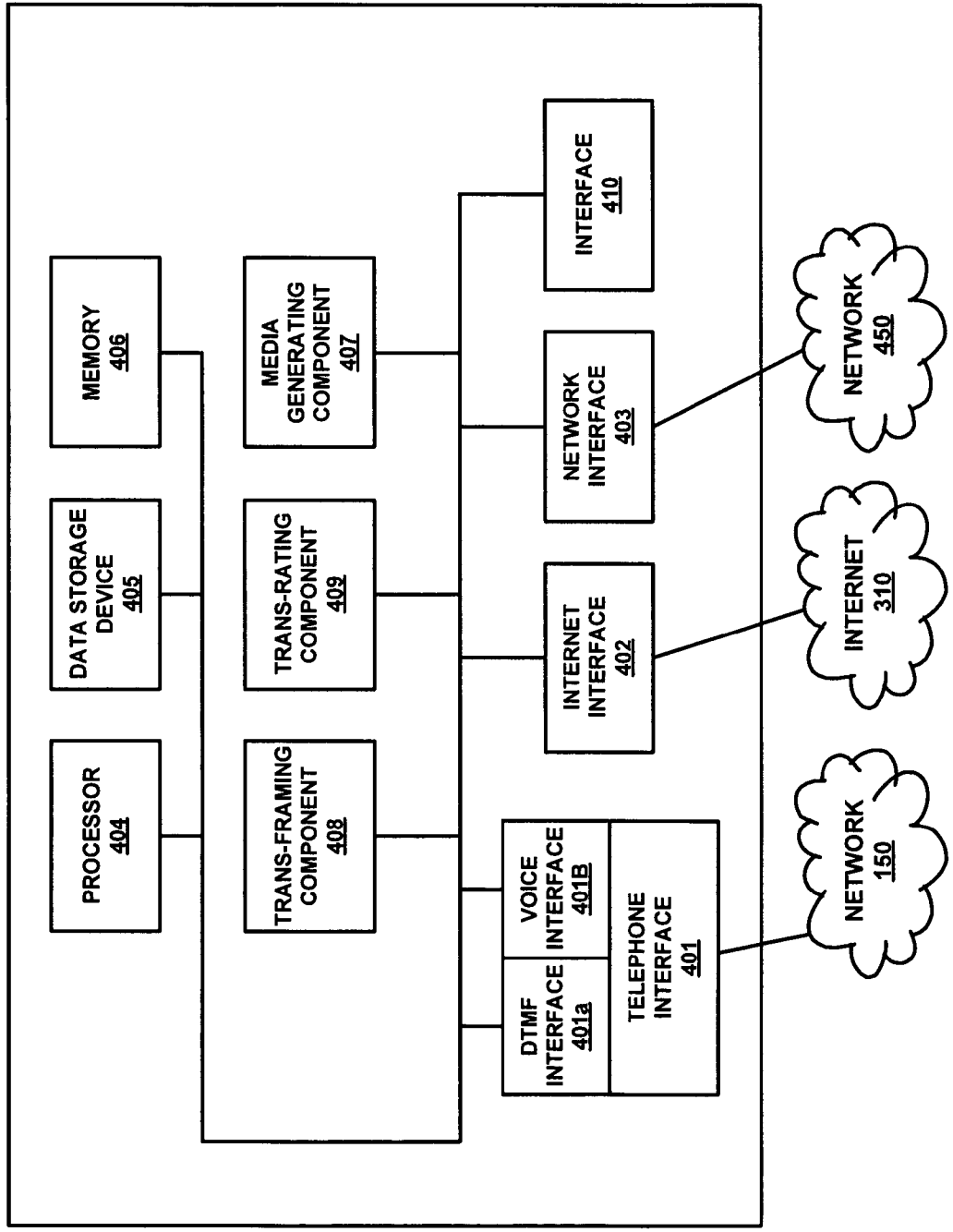
FIG. 4 is a block diagram of an exemplary media resource server in accordance with embodiments of the present invention.

FIG. 4 is a block diagram of an exemplary media resource server 121 in accordance with embodiments of the present invention. In the embodiment of FIG. 4, media resource server 121 comprises a telephone interface 401 coupled with network 150 (e.g., a cellular telephone network), a Internet interface 402 coupled with Internet 310, and a network interface 403 coupled with a network 450 (e.g., a wired network interface, a high-speed telephone line, a cable connection, etc.). In the embodiment of FIG. 4, telephone interface 401 further comprises further comprises a DTMF interface 401a for receiving and interpreting DTMF signals received via network 150 and a voice interface 401b for receiving voice commands sent via network 150. In the embodiment of FIG. 4, media resource server 121 further comprises a processor 404 for processing the digital information and instructions, a memory device 405 for storing the digital information and instructions, and a data storage device 406 for storing information and instructions of a more permanent nature. Media resource server 121 further comprises a media generating component 407 for generating streaming media which may be accessed by, for example, media access device 110. Media resource server 121 also comprises a trans-framing component 408 and a trans-rating component 409. In embodiments of the present invention, media resource server 121 may be coupled with the other components of media stream generating system 120 shown in FIG. 3 via a dedicated interface 410, or via interfaces 401, 310, or 320. It is appreciated that in other embodiments of the present invention, some of the discreet components shown in FIG. 4 may be incorporated. For example, the functions performed by trans-framing component 408, and/or trans-rating component 409, and/or media generating component 407 may be performed by processor 404.

In operation, media resource server 121 receives media (e.g., audio, video, or audio/video) via interfaces 402, 403, or 410 and outputs the a media stream from media to generating component 407 to media access device 110 via telephone interface 401. As described above, at times, it may be necessary to reduce the frame-rate and/or bit-rate of the media stream in order to comply with pre-designated network parameters (e.g., the SIP contract created when a connection is made between media access device 110 and media stream generating system 120. For example, the frame-rate and/or bit-rate which is input into media resource server 121 may already exceed the constraints imposed by the SIP contract. Alternatively, the user of media access device 110, or a third party, may request to speed up the display rate of the media stream. However, this sped-up display rate may result in exceeding the constrains of the SIP contract, thus necessitating a modification of the media stream in order to remain within the constraints of the SIP contract. In embodiments of the present invention, trans-framing component 408 dynamically determines which data frames can be dropped without significantly degrading the video quality of the modified media stream. Additionally, trans-rating component 409 dynamically determines whether modifications to the frame-rate implemented by trans-framing component 409 will cause the modified media stream to exceed the constraints of the SIP contract.

In embodiments of the present invention, the video frames are decoded as they are received from the file reader because video streams are typically encoded using very long group of picture (GOP) sizes (e.g., 24-75 frames per GOP). By decoding them as the frames are received, the computational load on media resource server 121 can be smoothed out across time, thus minimizing the added delay that on-demand decoding may otherwise induce. Trans-framing component 408 determines which video frames should be dropped in order to provide the sped-up playback without violating the contracted frame-rate. When a "drop frame" event is triggered, the frame following the dropped frame may be re-coded. All the frames following the re-coded frame that are differentially encoded can be sued without re-encoding. Thus, the original encoding of most of the frames is re-used, thereby minimizing both the computational load on media resource server 121 and the "second-generation" visual quality degradation associated with recoded frames.

Selection of the actual frames that are to be removed is complicated by a number of factors. For example, the requested speed-up factor is known, but may be changed dynamically. Additionally, the content sampling rate can be non-uniform under both the MP4 and H.263 standards. The actual content spacing is only known when the frame data is received. In contrast, the maximum allowed frame-rate is part of the service contract, and remains constant and known throughout the entire communications session. Dynamic trans-framing of streaming media will be discussed in greater detail below with reference to FIG. 5.

As discussed above, simply dropping frames from the media stream may not guarantee that the maximum bit-rate imposed by the service contract will not also be exceeded when the playback is sped-up. For example, if the original content was encoded using the full contracted bandwidth, it typically will not be sufficiently reduced by frame-rate reduction alone to conform with the contracted bit-rate. Additionally, if trans-framing component 408 re-encodes a P-frame as an I-frame because I-frames require more bits to encode than I-frames when encoding to the same level of perceptual quality. As a result, the modified media stream created in embodiments of the present invention typically has a greater frequency of I-frames than the original content. For example, if the original media stream, at the contracted frame rate, had an I-frame once every $N_{GOP}$ frames, the output stream of the modified media stream will average an I-frame once every $N_{GOP}/s$ frames where s equals the multiplier of the playback rate. Alternatively, if it is desired to introduce more I-frames to increase the number of seek points in the media file, or to limit the size of the GOPs to reduce errors in the media stream, a reduction in the bit-rate of the modified media stream may be performed. Depending upon the content being re-encoded, the I-frame typically comprises between 3.0×-8.0× more bits than a P-frame in that GOP. Thus, the greater number of I-frames in the modified media stream may actually introduce more bits into the media stream.

In embodiments of the present invention, trans-rating component 409 maintains a running estimate of the average I-frame bit-rate gain (e.g., with reference to a P-frame in that GOP) and maintains a running estimate of the average I-frame separation, which can also be expressed as the average size of the GOPs. These two values may be estimated using a single-pole Infinite Impulse Response (IIR) filter and the observed values from the media stream. In embodiments of the present invention, these values can be updated each time a new I-frame is received by media resource server 121.

Leveraging this information, embodiments of the present invention can determine how much above the contracted bit-rate the trans-framed sequence will be for a requested speed-up factor. Whenever the need for trans-rating seems likely, trans-rating component 409 uses the over-contract estimate as a running input into a computationally efficient real-time trans-coding implementation. In other words, if the running estimate of the I-frame bit-rate gain and frequency indicate that a trans-framed video stream will exceed the contracted bit-rate by 20%, dynamic bit-rate reduction algorithms may be implemented by trans-rating component 409 to bring the bit-rate within the constraints of the SIP contract (e.g., reducing the bit-allocation by 20%). An exemplary method for reducing the bit-rate of the media stream which may be implemented in embodiments of the present invention is described in a paper titled: "A Frequency-Domain Video Transcoder for Dynamic Bit-rate Reduction of MPEG-2 Bit Streams," by P. A. Assuncao and M. Ghanbari, published in IEEE Trans. On Circuits and Systems for Video Technology, vol. 8, PP. 953-967, December 1998. Another exemplary method for reducing the bit-rate of the media stream which may be implemented in embodiments of the present invention is described in a paper titled: A Very Fast Video Spatial-Resolution-Reduction Transcoder," by B. Shen and S. Roy, disclosed at the 2005 IEEE International Conference on Acoustics, Speech, and Signal Processing (ICASSP).

In embodiments of the present invention, drift correction is implemented by trans-rating component 409 to minimize error accumulation from the re-quantization of the coefficients. In embodiments of the present invention, the transrating algorithm reduces the load that would be required for a full re-encode at the target bit-rate by 5.0%-10.0%.

Figure 5:
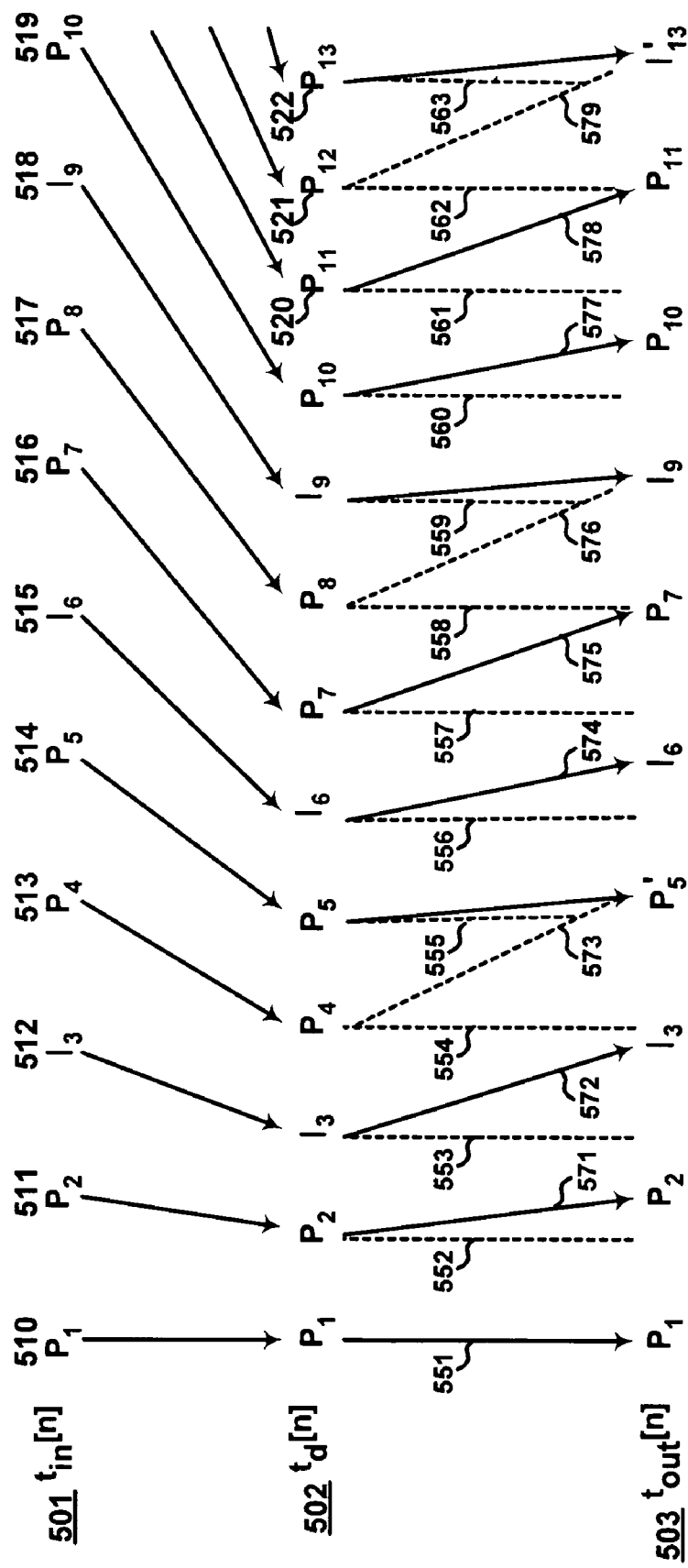
FIG. 5 shows the placement of data frames during a dynamic trans-framing in accordance with embodiments of the present invention.

FIG. 5 shows the placement of data frames during a dynamic trans-framing of in accordance with embodiments of the present invention. In FIG. 5, an original media stream 501 (e.g., $t_{in}$) a requested playback speed 502 (e.g., $t_d$), and a modified media stream 503 (e.g., $t_{out}$) are shown. In the embodiment of FIG. 5, original media stream 501 comprises P-frames 510 and 511, followed by an I-frame 512. I-frame 512 is then followed by P-frames 513 and 514 which comprise data that has changed from preceding I-frame 512. Another I-frame (e.g., 515) is then followed by P-frames 516 and 517. This is followed by I-frame 518 and P-frame 519. While the embodiment of FIG. 5 shows the content sampling rate of original media stream 501 to be at or below the maximum contracted frame-rate, it is noted that embodiments of the present invention may be used in situations in which that the frame-rate of original media stream may already exceed the maximum contracted frame-rate. Additionally, as described above, it is noted that the GOP length is typically longer than that shown in the exemplary media streams of FIG. 5.

In the embodiment of FIG. 5, the sampling rate of original media stream 501 is essentially uniform. However, as described above the content sampling rate of original media stream 501 may be non-uniform in both the MP4 and H.263 standards. Thus, the actual content sample spacing is typically known only when the frame data is received. In contrast, the maximum allowed frame rate of the outgoing media stream (e.g., modified media stream 503) is part of the service contract and is therefore constant and known. In other words, the spacing between successive video frames id determined by the SIP contract. In embodiments of the present invention, the requested playback speed (e.g., 502), along with the actual real-time protocol (RTP) timestamps of the original media stream 501 video encoding are combined to generate a desired placement of each video frame in the output stream of requested playback speed 502. Thus, the frame-rate of requested playback speed 502 basically defines the spacing of the video frames if no constraints were imposed by the SIP contract. In other words, the video frames are squeezed together without regard to the maximum allowed frame-rate. Additionally, while the requested speed-up factor from original media stream 501 to requested playback speed is known, it can be changed dynamically in response to, for example, user input.

The known contracted maximum frame rate is then enforced by spreading the desired placements of the video frames forward in time. This is represented in FIG. 5 by the greater spacing of video frames in modified media stream 503 in comparison with the frame spacing of requested playback speed 502. In embodiments of the present invention, if a video frame is received with an RTP timestamp that is equal to, or less than the RTP timestamp of the preceding video frame, that triggers a re-encoding of those two video frames into a single frame.

In embodiments of the present invention, the earliest allowed presentation time for output frames in modified media stream 503 may be calculated using the following formula:

$$t_d[n]=t_d[n-1]+\Delta t_d[n]$$

$$\Delta t_d[n]=(t_{in}[n]-t_{in}[n-1])/s$$

$$t_{out}[n]=t_{out}[n-1]+\max\{\Delta t_d[n], 1/r_c\}$$

Where s comprises the multiplier of the playback speed-up rate, $t_{in}[n]$ is the original (input) presentation time of the $n^{th}$ sample and $t_{out}[n]$ is the final output presentation time of the $n^{th}$ frame. In embodiments of the present invention, whenever $t_{out}[n]$ is greater than or equal to $t_d[n+1]$, the $n^{th}$ is dropped by re-encoding the $[n+1]^{th}$ frame. In FIG. 5, this results in frames $P_4$ (513), $P_8$ (517), and $I_{12}$ (520) being dropped. Additionally, the frames following the dropped frames are re-encoded, to remove dependencies on the dropped frame. For example, the re-encoded frame $P'_5$ uses $I_3$ as its reference. Additionally, there has been no observable delay due waiting to determine if $t_d[n+1]$ is less than $t_{out}[n]$ because the video packets are being released according to the (possibly hinted) timing indicated by the desired frame placement. Once $t_{out}[n]$ is known, that frame is simply held for another $t_{out}[n]-t_d[n]$ seconds. This offset is the same as the offset that is added to the desired presentation time, so the release timing is correctly adjusted from the desired frame placement. If the next frame arrives during the delay period, a re-encoding is necessitated. If the next frame does not arrive during the delay period, there is no need to re-encode.

Returning to FIG. 5, the desired output presentation times of the video frames, as determined by the requested playback speed 502, are shown by lines 551, 552, 553, 554, 555, 556, 557, 558, 559, 560, 561, 562, and 563. The final output presentation times of the video frames as determined by the contracted frame-rate are shown by lines 571, 572, 573, 574, 575, 576, 577, 578, and 579. As shown in FIG. 5, the desired output presentation times of frames $P_1$, $P_2$, and $I_3$ (e.g., 551, 552, and 553 respectively) are not greater than or equal to the final output presentation times for frames $P_2$, and $I_3$ (e.g., 571 and 572 respectively). However, the final output presentation time (e.g., 573) of frame $P_4$ (513) does exceed the desired output presentation time (e.g., 555) of succeeding frame $P_5$ (514). Therefore, frame $P_4$ (513) is dropped and frame $P_5$ (514) is re-encoded to remove the dependencies of frame $P_4$ (513). As a result, a new frame $P'_5$ (530) is generated by media resource server 121. While the final output presentation time for frame $P_8$ exceeds the final output presentation time for frame $I_9$, a re-encoding of frame $I_9$ is not necessary because frame $I_9$ is already an I-frame.

In the case of frame $I_{12}$, the final output presentation time of that frame exceeds the desired presentation time of frame $P_{13}$. However, in order to maintain the seek point in the file, frame $P_{13}$ is re-encoded as an I-frame (e.g., $I'_{13}$). In embodiments of the present invention, original file seek points are maintained because if the frame to be dropped is an I-frame, the following frame is re-encoded as an I-frame. This again reduces the computational load on media stream generating system 120 since I-frame encoding takes less computation, by not requiring motion-estimation searches. Additionally, the I-frame encoding of frame $I'_{13}$ keeps the seek point in the middle of what would otherwise become a doubly-long GOP. Computationally, the trans-framing described above requires a full decode plus re-encoding of $r_c \times \min\{1, (s-1)\}$ frames per second.

Figure 6:
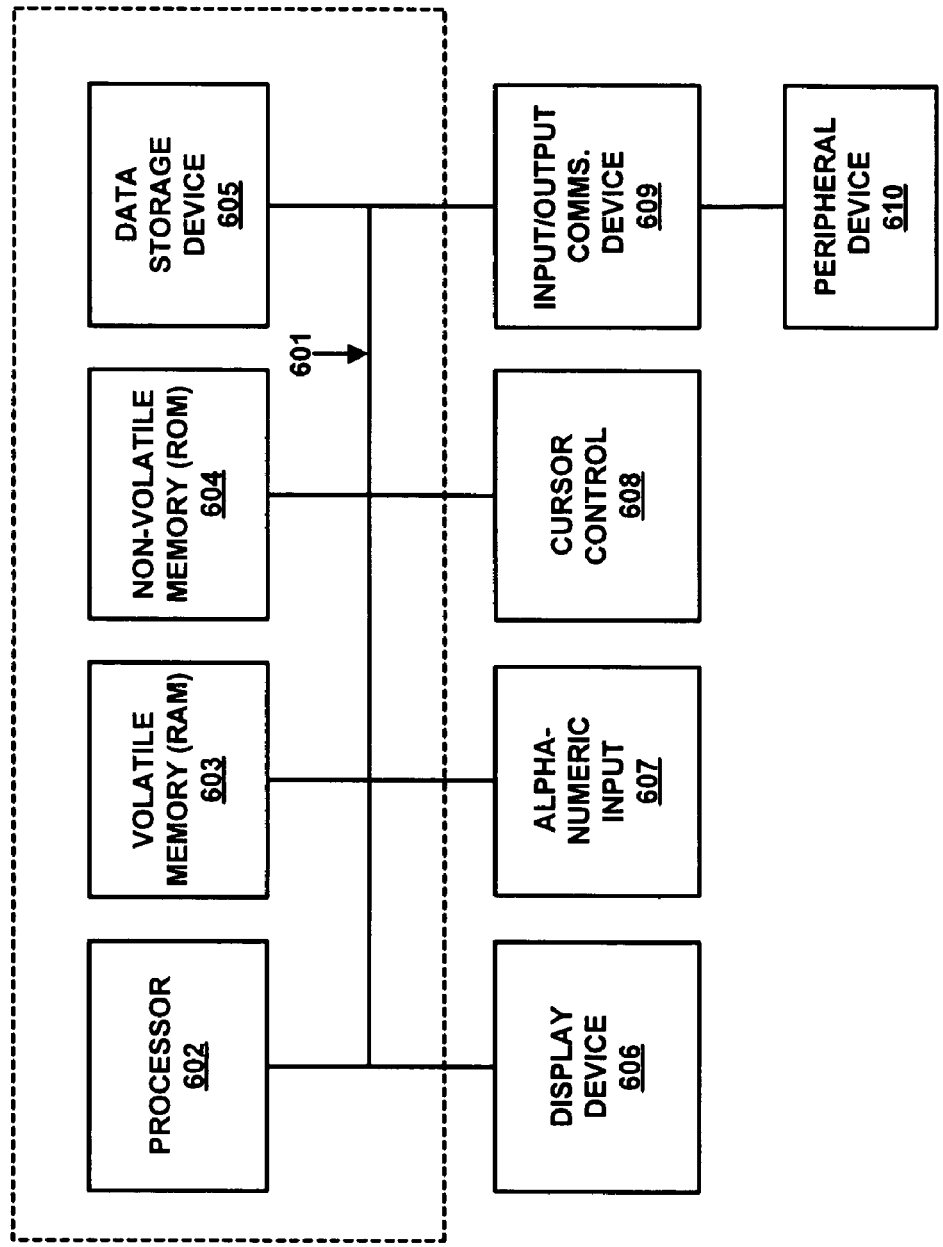
FIG. 6 is a block diagram of an exemplary computer system utilized in accordance with embodiments of the present invention.

With reference to FIG. 6, portions of the present invention are comprised of computer-readable and computer-executable instructions that reside, for example, in computer system 600 which is used as a part of a general purpose computer network (not shown). It is appreciated that computer system 600 of FIG. 6 is exemplary only and that the present invention can operate within a number of different computer systems including general-purpose computer systems, embedded computer systems, laptop computer systems, hand-held computer systems, and stand-alone computer systems.

In the present embodiment, computer system 600 includes an address/data bus 601 for conveying digital information between the various components, a central processor unit (CPU) 602 for processing the digital information and instructions, a volatile main memory 603 comprised of volatile random access memory (RAM) for storing the digital information and instructions, and a non-volatile read only memory (ROM) 604 for storing information and instructions of a more permanent nature. In addition, computer system 600 may also include a data storage device 605 (e.g., a magnetic, optical, floppy, or tape drive or the like) for storing vast amounts of data. It should be noted that the software program for interactively controlling media of the present invention can be stored either in volatile memory 603, data storage device 605, or in an external storage device (not shown).

Furthermore, computer system 600 can include an input/output (I/O) signal unit (e.g., interface) 609 for interfacing with a peripheral device 610 (e.g., a computer network, modem, mass storage device, etc.). Accordingly, computer system 600 may be coupled in a network, such as a client/server environment, whereby a number of clients (e.g., personal computers, workstations, portable computers, mini-computers, terminals, etc.) are used to run processes for performing desired tasks. In particular, computer system 600 can be coupled in a system for interactively controlling media.

The preferred embodiment of the present invention, a method and system for interactively controlling media, is thus described. While the present invention has been described in particular embodiments, it should be appreciated that the present invention should not be construed as limited by such embodiments, but rather construed according to the following claims.

What is claimed is:

1. A computer implemented method for modifying a media stream, said method comprising:
   receiving a request at said computer to modify a media stream from a current display rate to a desired display rate; and
   dynamically processing at said computer said media stream to create a modified media stream which is compliant with a pre-determined frame-rate limitation and with a pre-determined bit-rate limitation, wherein said dynamically processing said media stream further comprises:
   determining a desired frame-rate in response to receiving said request;
   determining a desired frame-time for each of a plurality of data frames in accordance with said desired frame-rate;
   determining a corresponding output presentation time for each of said plurality of data frames; and
   modifying a first of said plurality of data frames if the output presentation time for said first data frame is at least equal to the desired frame-time for a second data frame immediately succeeding said first data frame unless said second data frame comprises an intra-coded frame (I-frame).

2. The computer implemented method as recited in claim 1 wherein said first data frame and said second data frame comprise predictive-coded frames (P-frames) and wherein said modifying comprises:
   dropping said first data frame; and
   re-encoding said second data frame to remove any dependencies on said first data frame.

3. The computer implemented method as recited in claim 1 wherein said first data frame comprises a predictive-coded frame (P-frame) and said second data frame comprises an intra-coded frame (I-frame) and wherein said modifying comprises:
   dropping said first data frame; and
   presenting said second data frame in the output presentation time of said first data frame.

4. The computer implemented method as recited in claim 1 wherein said first data frame comprises an intra-coded frame (I-frame) and said second data frame comprises a predictive-coded frame (P-frame) and wherein said modifying comprises:
   dropping said first data frame; and
   re-encoding said second data frame as an intra-coded frame (I-frame).

5. The computer implemented method as recited in claim 1 wherein dynamically processing said media stream further comprises:
   determining whether said modified media stream exceeds said pre-determined bit-rate limitation in response to said modifying.

6. The computer implemented method as recited in claim 5 further comprising;
   determining a ratio between an average number of bits in a plurality of predictive-coded frames (P-frames) of said media stream and an average number of bits in a plurality of intra-coded frames (I-frames) of said media stream;
   determining an average group of pictures (GOP) length of said media stream;
   determining whether said modified media stream exceeds said pre-determined bit-rate limitation; and
   reducing the bit-rate of said modified media stream to comply with said pre-determined bit-rate limitation.

7. An interactive media stream system comprising:
   a media access device for displaying a media stream; and
   a media stream generating device communicatively coupled with said media access device, said media stream generating device for receiving a request to modify said media stream from a current display rate to a desired display rate and for dynamically processing said media stream in response to said request to create a modified media stream which is compliant with a pre-determined frame-rate limitation and with a pre-determined bit-rate limitation and wherein said dynamically processing said media stream comprises:
   determining a desired frame-rate in response to receiving said request;
   determining a desired frame-time for each of a plurality of data frames in accordance with said desired frame rate;
   determining a corresponding output presentation time for each of said plurality of data frames; and
   modifying a first data frame of said plurality of data frames if the output presentation time for said first data frame is at least equal to the desired frame-time for a second data frame immediately succeeding said first data frame unless said second data frame comprises an intra-coded frame (I-frame).

8. The system of claim 7 wherein said first data frame and said second data frame comprise predictive-coded frames (P-frames) and wherein said media stream generating device drops said first data frame and re-encodes said second data frame to remove any dependencies on said first data frame.

9. The system of claim 7 wherein said first data frame comprises a predictive-coded frame (P-frame) and said second data frame comprises an intra-coded frame (I-frame) and wherein said media stream generating device drops said first data frame and presents said second data frame in the output presentation time of said first data frame.

10. The system of claim 7 wherein said first data frame comprises an intra-coded frame (I-frame) and said second data frame comprises a predictive-coded frame (P-frame) and wherein said media stream generating device drops said first data frame and re-encodes said second data frame as an intra-coded frame (I-frame).

11. The system of claim 7 wherein dynamically processing said media stream further comprises:
determining whether said modified media stream exceeds said pre-determined bit-rate limitation in response to said modifying.

12. The system of claim 11 wherein said dynamically processing further comprises;
determining a ratio between an average number of bits in a plurality of predictive-coded frames (P-frames) of said media stream and an average number of bits in a plurality of intra-coded frames (I-frames) of said media stream;
determining an average group of pictures (GOP) length of said media stream;
determining whether said modified media stream exceeds said pre-determined bit-rate limitation; and
reducing the bit-rate of said modified media stream to comply with said pre-determined bit-rate limitation.

13. A media stream generating system comprising:
a component for receiving a request to modify a media stream from a current display rate to a desired display rate; and
a media stream modifying device for dynamically processing said media stream to create a modified media stream which is compliant with a pre-determined frame-rate limitation and with a pre-determined bit-rate limitation, wherein said media stream modifying device implements a frame-rate transcoding process comprising:
determining a desired frame-rate in response to receiving said request;
determining a desired frame-time for each of a plurality of data frames in accordance with said desired frame rate;
determining a corresponding output presentation time for each of said plurality of data frames; and
modifying a first of said plurality of data frames if the output presentation time for said first data frame is at least equal to the desired frame-time for a second data frame immediately succeeding said first data frame unless said second data frame comprises an intra-coded frame (I-frame).

14. The system of claim 13 wherein said first data frame and said second data frame comprise predictive-coded frames (P-frames) and wherein said media stream modifying device drops said first data frame and re-encodes said second data frame to remove any dependencies on said first data frame.

15. The system of claim 13 wherein said first data frame comprises a predictive-coded frame (P-frame) and said second data frame comprises an intra-coded frame (I-frame) and wherein said media stream modifying device drops said first data frame and presents said second data frame in the output presentation time of said first data frame.

16. The system of claim 13 wherein said first data frame comprises an intra-coded frame (I-frame) and said second data frame comprises a predictive-coded frame (P-frame) and wherein said media stream modifying device drops said first data frame and re-encodes said second data frame as an intra-coded frame (I-frame).

17. The system of claim 13 wherein said media stream modifying device further implements a bit-rate transcoding process comprising:
determining whether said modified media stream exceeds said pre-determined bit-rate limitation in response to said modifying.

18. The system of claim 17 wherein said bit-rate transcoding process further comprises;
determining a ratio between an average number of bits in a plurality of predictive-coded frames (P-frames) of said media stream and an average number of bits in a plurality of intra-coded frames (I-frames) of said media stream;
determining an average group of pictures (GOP) length of said media stream;
determining whether said modified media stream exceeds said pre-determined bit-rate limitation; and
reducing the bit-rate of said modified media stream to comply with said pre-determined bit-rate limitation.

* * * * *

UNITED STATES PATENT AND TRADEMARK OFFICE
CERTIFICATE OF CORRECTION

PATENT NO. : 7,643,422 B1 Page 1 of 1
APPLICATION NO. : 11/389401
DATED : January 5, 2010
INVENTOR(S) : Michele Covell et al.

It is certified that error appears in the above-identified patent and that said Letters Patent is hereby corrected as shown below:

On the Title Pg Item (75), Inventors, line 2, delete "Menlo Park" and insert -- Palo Alto --, therefor.

Signed and Sealed this

Twelfth Day of October, 2010

David J. Kappos
*Director of the United States Patent and Trademark Office*